C. B. & G. W. HART.
Milk Rack and Fruit Drier.
No. 65,907. Patented June 18, 1867.
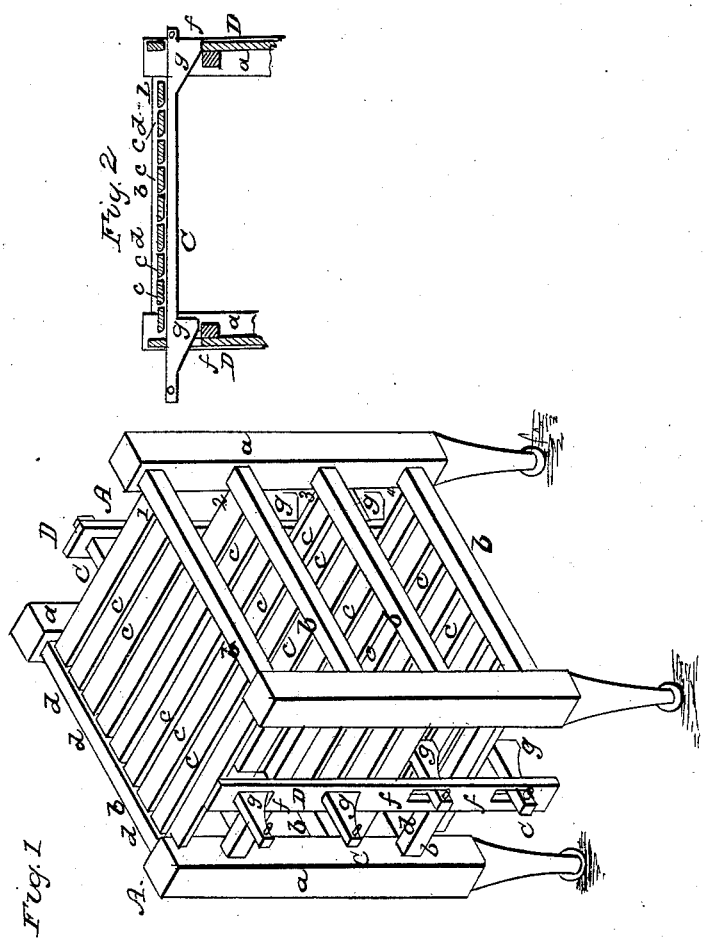

United States Patent Office.

C. B. HART, AND G. W. HART, OF VICTOR, NEW YORK.

*Letters Patent No. 65,907, dated June 18, 1867.*

COMBINED MILK-RACK AND FRUIT-DRYER.

*The Schedule referred to in these Letters Patent and making part of the same.*

TO ALL WHOM IT MAY CONCERN:

Be it known that we, C. B. and G. W. HART, of Victor, in the county of Ontario, and State of New York, have invented a certain new and useful improvement in Combined Milk-Racks and Fruit-Dryers; and we do hereby declare that the following is a full and exact description thereof, reference being had to the accompanying drawings, making part of this specification.

Figure 1 is a perspective view of our improved rack and dryer.

Figure 2, a vertical section through the slats constituting one of the shelves, said slats being closed in the position for drying fruit.

Like letters of reference indicate corresponding parts in both figures.

Our invention consists in a combined milk-rack and fruit-dryer, having a series of shelves composed of slats which fall open of their own weight to form the support for the milk-pans, and give ample ventilation, but which close to form a bed for the fruit by the action of sliding wedge-bars, as hereinafter set forth.

As represented in the drawings, A is a frame consisting preferably of four posts $a\ a\ a\ a$ with cross-bars $b\ b\ b\ b$, forming a stiff connection. In this frame is situated a series of shelves, 1 2 3 4, &c., at suitable distance apart to receive the pans of milk. These shelves consist each of a series of slats, $c\ c\ c$, having bearings or journals $d\ d\ d$ at opposite ends on one edge resting in the bars $b\ b$, so that said slats will hang down free of their own weight. Beneath the slats are sliding-bars C C C, having wedges $g\ g$ resting in sockets $f\ f$ of strips D D. When these bars are drawn up, as in fig. 2, they raise and close the slats, leaving only small cracks between the latter for the passage of air, as shown.

In holding milk the wedge-bars are depressed and the slats hang down loose, as shown in the two bottom shelves. In this condition the shelves are perfectly open, and give the greatest amount of ventilation. The slats being thin, and at considerable distance apart, allow a free passage of the air through the whole extent. In drying fruit, the wedge-bars are raised and the slats closed, as shown in the two upper shelves, leaving only narrow cracks between the edges of the slats for a suitable circulation of air. The fruit is spread on the slats and placed in the open air or in a warm room, as may be desired. This twofold action accomplished by the loose hanging of the slats, and the employment of the wedge-bars, is of great advantage to farmers and dairymen, since it saves two distinct devices for the purposes. The one arrangement is adapted perfectly to both purposes by simply changing the position of the slats.

What we claim as our invention, and desire to secure by Letters Patent, is—

The combined milk-rack and fruit-dryer provided with loosely pivoted slats forming the shelves capable of being opened or closed by the wedge-bars beneath, the whole constructed and arranged, as described, and operating in the manner set forth.

In witness whereof we have hereunto signed our names in the presence of two subscribing witnesses.

C. B. HART,
G. W. HART.

Witnesses:
ORIN S. BACON,
EDWARD WILLIAMS.